(12) United States Patent
Weisbach

(10) Patent No.: US 12,228,851 B2
(45) Date of Patent: Feb. 18, 2025

(54) CAMERA SHUTTER DEVICE HAVING A TWO-ARMED LEVER

(71) Applicant: JENOPTIK Optical Systems GmbH, Jena (DE)

(72) Inventor: Frank Weisbach, Jena (DE)

(73) Assignee: JENOPTIK Optical Systems GmbH, Jena (DE)

(*) Notice: Subject to any disclaimer, the term of this patent is extended or adjusted under 35 U.S.C. 154(b) by 77 days.

(21) Appl. No.: 18/006,809

(22) PCT Filed: Aug. 5, 2021

(86) PCT No.: PCT/DE2021/100672
§ 371 (c)(1),
(2) Date: Jan. 25, 2023

(87) PCT Pub. No.: WO2022/033632
PCT Pub. Date: Feb. 17, 2022

(65) Prior Publication Data
US 2023/0273505 A1 Aug. 31, 2023

(30) Foreign Application Priority Data
Aug. 12, 2020 (DE) ............... 10 2020 121 173.2

(51) Int. Cl.
*G03B 9/10* (2021.01)
(52) U.S. Cl.
CPC ..................... *G03B 9/10* (2013.01)

(58) Field of Classification Search
CPC ... G03B 9/10; G03B 9/08; G03B 9/36; G03B 9/40
See application file for complete search history.

(56) References Cited

U.S. PATENT DOCUMENTS

| 3,956,761 | A | 5/1976 | Koch et al. |
| 4,112,450 | A | 9/1978 | Kondo |
| 4,121,235 | A | 10/1978 | Fujita et al. |
| 4,171,987 | A | 10/1979 | Horiguchi et al. |
| 4,316,661 | A | 2/1982 | Saito |
| 6,123,466 | A | 9/2000 | Persson et al. |
| 8,956,059 | B1 | 2/2015 | Stephenson et al. |
| 2011/0299846 | A1* | 12/2011 | Weisbach ............... H04N 23/55 396/453 |

FOREIGN PATENT DOCUMENTS

| CN | 202748581 U | 2/2013 |
| DE | 1 447 470 A1 | 3/1969 |

(Continued)

*Primary Examiner* — Christopher E Mahoney
(74) *Attorney, Agent, or Firm* — Christensen, Fonder, Dardi & Herbert PLLC

(57) ABSTRACT

A camera shutter device including an optical opening and an electromagnetic drive mounted fixedly relative to the opening, and having a linearly guided, movable part which is fixedly connected to a first shutter blade to form one unit. The unit is connected to a drive end of a two-armed lever which is rotatable about an axis of rotation. A counterweight is provided at an output end of the lever. A second weight force acting on the counterweight causes a second torque about the axis of rotation of the lever, which counteracts a first torque which is caused by a first weight force acting on the unit.

16 Claims, 6 Drawing Sheets

(56) References Cited

FOREIGN PATENT DOCUMENTS

| | | |
|---|---|---|
| DE | 26 42 601 A1 | 3/1977 |
| DE | 27 07 175 A1 | 8/1977 |
| DE | 30 17 893 A1 | 11/1980 |
| GB | 2 235 541 A | 3/1991 |
| JP | H0615021 U * | 2/1994 |

* cited by examiner $M_1 = r_1 \cdot \sin \phi_1 \cdot F_1$
$M_2 = r_2 \cdot \sin \phi_2 \cdot F_2$
$M_1 \approx M_2$

CAMERA SHUTTER DEVICE HAVING A TWO-ARMED LEVER

PRIORITY CLAIM

The present application is a National Phase entry of PCT Application No. PCT/DE2021/100672, filed Aug. 5, 2021, which claims priority from German Patent Application No. 10 2020 121 173.2, filed Aug. 12, 2020, the disclosures of which are hereby incorporated by reference herein in their entirety.

FIELD OF THE INVENTION

The invention relates to a shutter device for a camera module for use in various types of photography and thermal imaging devices, as well as devices for measuring the imaging quality of lenses and for calibrating image sensors.

BACKGROUND OF THE INVENTION

The invention relates to a shutter device for a camera module (e.g. an IR camera module), in particular for use in various types of photography and thermal imaging devices, as well as devices for measuring the imaging quality of lenses and for calibrating image sensors, which shutter device uses electromagnetic forces for opening and closing, as known generically from DE 27 07 175 A1.

Shutter devices are used in cameras and optical sensors to interrupt the optical beam path when necessary. A major challenge in the design of such shutter devices is the ongoing miniaturization of camera modules with increasing demands on heat generation, actuation time, lifetime, operating temperature, cost and the like. Known solutions include iris diaphragms, focal plane shutters or pivoting or guided shutters, which are driven electromagnetically or by a motor.

In infrared or thermal imaging applications, it is necessary to perform a so-called "dark frame calibration" at certain time intervals to correct certain detector parameters that often drift over time during camera operation. In this process, a shutter device is closed and the resulting dark image is used for offset correction. In radiometric cameras, such a shutter device also serves as a temperature reference to improve measurement accuracy.

DE 1 447 470 A discloses an electromagnetically actuated shutter mechanism in which there is a certain time interval between an opening pulse and a closing pulse. The shutter element is braked in a certain position by stops. In the process, it performs vibrations after impact due to the kinetic energy still present. These vibrations can lead to the exposure time being subject to errors or to image blurring due to the transfer of said vibrations to the sensor.

CN 202 748 581 U discloses a shutter device for a camera module with a frame, two shutter blades, permanent magnets, springs, two linear sliding structures, electromagnets and a light transmission zone. The two shutter blades each have two sliding cylinders via which they are guided between two positions on the two linear sliding structures arranged parallel to each other, which are designed here as guide cylinders. The sliding cylinders on the shutter blades are permanent magnets. An electromagnet is arranged centrally on each of the guide cylinders. Depending on its polarity, it attracts or repels the sliding cylinders, which are designed as permanent magnets, against the spring forces of the compression springs arranged around the guide cylinders. In the de-energized state, the shutter blades are applied to the frame in a first position in which the shutter blades clear the light transmission zone, with the frame acting as a stop. In the second position, the shutter blades close the light transmission zone, while overlapping slightly. The sliding cylinders contact the electromagnet under the effect of the magnetic force. The same problems exist here, namely the occurrence of vibrations at the end of the movement of the shutter element.

A disadvantage of many prior art camera shutter devices that use magnetic force to move a shutter blade to two positions is that a permanent magnet or ferromagnetic body is acted upon by a force resulting from the magnetic field to accelerate its mass and move the associated shutter blade directly or indirectly, often undamped, to the two positions. The shutter blade can rebound from the end positions and unintentionally partially open or close the optical beam path again for a short time.

An electromagnetically actuated shutter mechanism is known from DE 26 42 601 C2, in which a shutter element opens an exposure opening by an opening pulse and closes it by a closing pulse. In this case, impact vibrations at the reversal points of the shutter element are avoided by partially overlapping the opening pulse with the closing pulse, as a result of which the shutter element releases most of its kinetic energy before reaching a reversal point.

From the aforementioned DE 30 17 893 A1, a camera shutter device with two shutter blades is known, each of which is connected to a linearly guided moving part of an electromagnetic drive via a rotatably mounted connecting member. The shutter blades and their respective moving parts are moved in opposite directions to each other symmetrically to an axis of the rotatably mounted connecting members. Thus, with the axis substantially horizontal, the weight force of each of the moving parts on the axis of the connecting members causes a torque that counteracts a torque caused by the weight force of the shutter blade. The unwinding movement of the respective shutter blade between an open position and a closed position can thus be carried out with considerably less force, as the torques compensate each other. Any impact of the shutter blade that occurs when the unwinding movement is stopped in the two positions is kept to a minimum.

A double rocker is provided as a guide for the shutter blades in all exemplary embodiments of the aforementioned DE 30 17 893 A1, wherein one arm of the rocker is provided with a pin that engages in a first elongated hole formed at an output end of the rotatably mounted connecting member. A second elongated hole is formed at the other, input end of the rotatably mounted connecting element, in which a pin provided on the moving part of the magnetic drive engages. The moving part of the magnetic drive, guided in a cylindrical coil, and the shutter blade are guided linearly parallel to each other.

An electromagnetically operated shutter known from U.S. Pat. No. 4,171,987 A has two shutter blades. The shutter blades are arranged symmetrically on either side of an exposure opening and are mounted for movement in opposite directions along a common linear axis, the opposite movement being coupled via a connecting member. The free ends of the shutter blades are each designed as an electromagnetic linear drive. One drive is used to open the shutter and one to close it, so that the movement of the shutter blades can also be slowed down. In the de-energized state, however, the position of the shutter is undefined.

GB 2 235 541 A discloses an electromagnetically operated camera shutter with two shutter blades. The shutter blades are each mounted to tilt about a pivot point and are connected at a common bearing point to a spring-loaded return lever, which in turn is connected to an electromagnetic linear drive. The shutter is opened with the electromagnetic linear drive, against the spring force of the return lever. The return lever has a counterweight to compensate for the weight forces of the shutter mechanism acting on the return lever. This is to achieve independence from the position of the camera when operating the shutter.

From the aforementioned DE 27 07 175 A1, a camera shutter device with an optical opening and an electromagnetic drive fixedly arranged with respect to it is known. A shutter blade is attached to a linearly guided part, said shutter blade being movable to an open position exposing the optical opening and a closed position covering the optical opening. A two-armed lever is provided, which can be pivoted about a pivot point and is connected to the linearly guided part at an input end, and a counterweight is provided at its output end. Said counterweight causes a torque on the axis of rotation, which counteracts a torque caused by a weight force. A particular disadvantage of the above-mentioned shutter devices is that a separate electric motor drive is required to move each of the two shutter blades. The shutter device is also unstable in the de-energized state, i.e. vibrations, in particular shocks or oscillations acting in the actuation direction, can cause the shutter blades to move out of their respective positions.

SUMMARY OF THE INVENTION

It is an object of the invention to provide a camera shutter device which can have a more compact design.

This object is achieved for a camera shutter device according to the invention comprising an optical opening and an electromagnetic drive mounted fixedly relative to the opening, a first shutter blade and a two-armed lever.

The electromagnetic drive has a linearly guided moving part. The first shutter blade is movable to an open position exposing the optical opening and to a closed position covering the optical opening.

The two-armed lever is divided into an input end and an output end by a pivot point and can be pivoted about the pivot point over a pivot angle range. The pivot point is located on an axis of rotation fixed relative to the optical opening, and the input end is in communication with the moving part.

The first shutter blade forms a unit which is fixedly connected to the moving part and there is a counterweight at the output end of the two-armed lever. A second weight force acts on the counterweight, causing a second torque about the axis of rotation that counteracts a first torque caused by a first weight force acting on the unit.

Due to the fact that the first shutter blade is fixedly connected to the moving part and forms a unit with it, and that there is a counterweight at the output end of the two-armed lever, a second weight force acts on the counterweight, which causes a second torque about the axis of rotation, which counteracts a first torque caused by a first weight force acting on the unit.

It is essential to the invention that either the camera shutter device has a first permanent magnet which has at least one magnetic face and which is fixedly arranged within the pivot angle range, arranged in association with the counterweight in such a way that the counterweight is held in the open position and the closed position by the magnetic force of the first permanent magnet, or a first and a second permanent magnet, each having at least one magnetic face, are provided. These permanent magnets are arranged in association with the counterweight so that the counterweight is held in the open position and the closed position by the magnetic force of the first or the second permanent magnet.

In particular, the counterweight is made of a ferromagnetic material and one of the at least one magnetic faces is arranged to face one of two different surface portions of an outer circumferential surface of the counterweight in the open position and the closed position, respectively.

It is advantageous if the counterweight is made of a ferromagnetic material and there are at least two magnetic faces, one of the at least two magnetic faces, in the open position, facing a surface portion of an inner circumferential surface of the counterweight and another of the at least two magnetic faces, in the closed position, facing another surface portion of the inner circumferential surface of the counterweight.

Alternatively, it is advantageous if the first permanent magnet is attached to the counterweight and a ferromagnetic armature with two end faces facing the counterweight is arranged within the pivot angle range, wherein one of the at least one magnetic faces is arranged facing one of the two end faces in the open position and facing the other of the two end faces in the closed position.

In particular, the counterweight is made of a ferromagnetic material and the first and second permanent magnets are arranged opposite each other outside the pivot angle range. One of the at least one magnetic faces of the first permanent magnet is disposed opposite a surface portion of an outer circumferential surface of the counterweight in the open position, and one of the at least one magnetic faces of the second permanent magnet is disposed opposite another surface portion of the outer circumferential surface of the counterweight in the closed position.

Advantageously, in each of the open position and the closed position, the respective magnet face and the respective surface portion enclose a gap with each other that is narrower than any distance between the counterweight and the first and second permanent magnets, respectively, during movement between the open position and the closed position.

The counterweight may advantageously include a second shutter blade.

It is advantageous if the second shutter blade is fixedly connected to a linearly guided connecting rod which, together with the second shutter blade, forms the counterweight and is rotatably mounted on the output end of the two-armed lever.

Advantageously, the electromagnetic drive is a solenoid, with a coil and a ferromagnetic or permanent-magnet armature core, the armature core being attached to a plunger, which is the moving part.

The ratio of a stroke length of the electromagnetic drive to the overall length of the camera shutter device in the direction of the stroke length is advantageously greater than 1:2.

For this purpose, the coil has a bobbin and advantageously an at least two-phase winding, whereby the movement of the plunger is caused simultaneously by both attractive forces and repulsive forces acting locally one after the other in the direction of the stroke length.

It is particularly advantageous if the bobbin provides a linear sliding guide for the plunger.

It is also advantageous to have a ferromagnetic enclosure that surrounds the coil, thereby increasing a magnetic flux created inside the coil and reducing a stray field created around the coil.

The camera shutter device described in the aforementioned DE 30 17 893 A1 is obviously based on the consideration of at least partially compensating the weight force acting on the mass of the moving part of an electromotive drive unit with the weight force acting on the shutter blade. For this purpose, the moving part and the shutter blade are connected to each other via a connecting member that is mounted to rotate about a pivot point. The pivot point is located between two pins, which are present on the shutter blade and on the moving part, respectively, and are each guided in an elongated hole formed on the connecting member.

The present invention is based on the finding that the camera shutter device can be made more compact and more stable if the shutter blade is fixedly connected directly to the moving part of the electromagnetic drive. A counteracting torque is generated with a counterweight that can also contain a second shutter blade, allowing both one and two shutter blades to be driven with a single electromechanical drive.

BRIEF DESCRIPTION OF THE DRAWINGS

The invention will be explained in more detail below with reference to exemplary embodiments and drawings. In the drawings.

DETAILED DESCRIPTION OF THE DRAWINGS

In all embodiments, a camera shutter device according to the invention includes an optical opening 1, an electromagnetic drive 2 fixedly arranged with respect thereto and having a linearly guided moving part, and a first shutter blade 3 forming a unit 23 fixedly connected to the moving part.

Figure 1A:
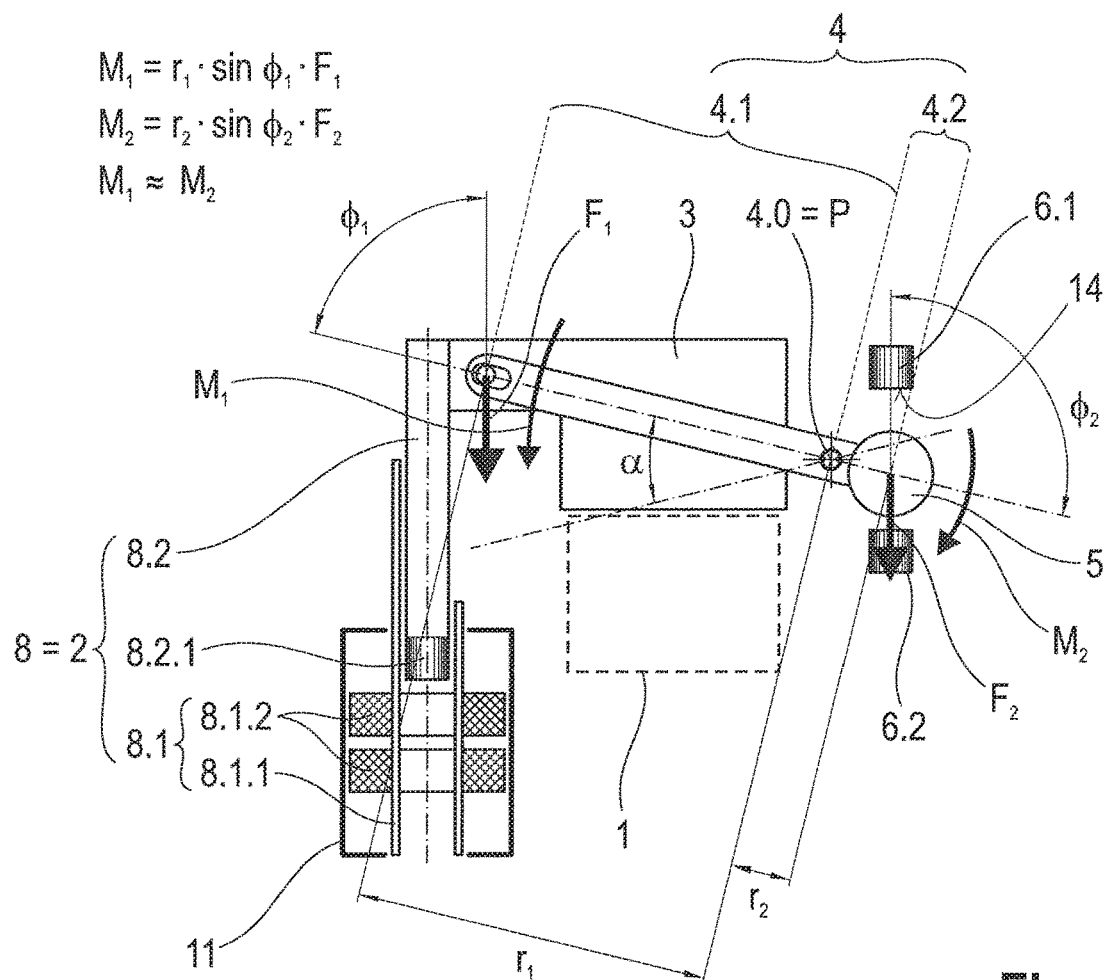
FIGS. 1a and 1b show a first exemplary embodiment of a camera shutter device having a shutter blade, wherein the counterweight is pivotable between a first and a second permanent magnet.
Figure 1B:
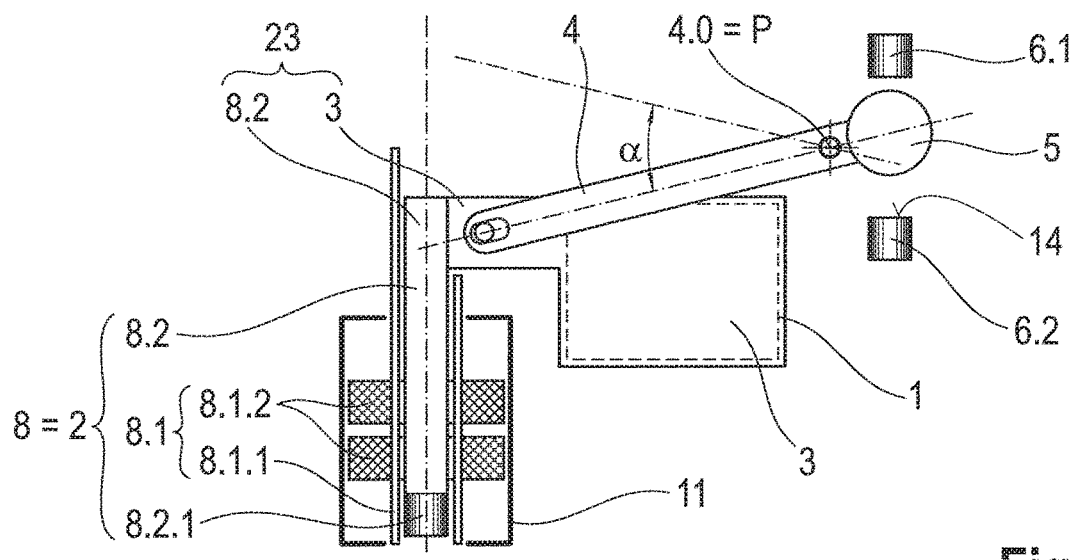
Figure 2A:
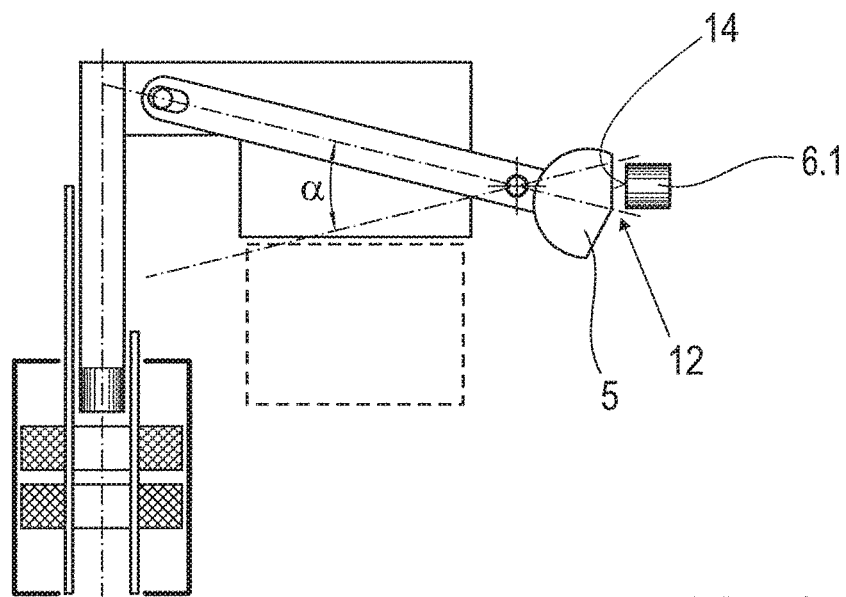
FIGS. 2a and 2b show a second exemplary embodiment, wherein the counterweight is pivotable relative to a first permanent magnet.
Figure 2B:
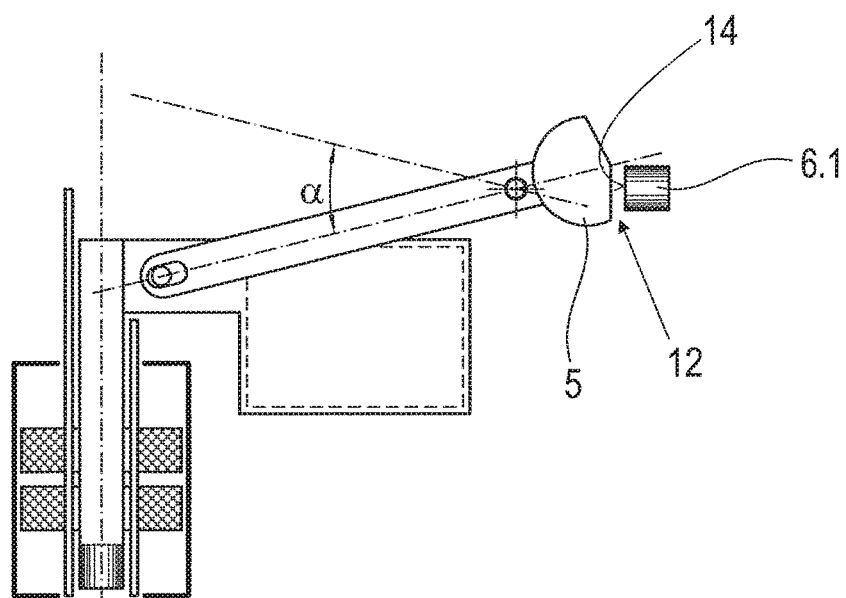

The shutter blade 3 is movable to an open position exposing the optical opening 1 (see FIG. 1a and FIG. 2a) and to a closed position covering the optical opening 1 (see FIG. 1b and FIG. 2b). In addition, a two-armed lever 4 is provided, which is divided into an input end 4.1 and an output end 4.2 by a pivot point P and can be pivoted about the pivot point P over a pivot angle range α. The pivot point P is located on an axis of rotation 4.0 fixed relative to the optical opening 1. The input end 4.1 of the two-armed lever 4 is in communication with the moving part by a rotary joint formed by a pin engaging in an elongated hole, and a counterweight 5 is provided at the output end 4.2 of the two-armed lever 4.

A first weight force $F_1$ acts on the unit 23, essentially determined by the mass of the plunger 8.2 and the first shutter blade 3, while a second weight force $F_2$ acts on the counterweight 5, determined by its mass.

The first weight force $F_1$ causes a first torque $M_1$ about the axis of rotation 4.0, which counteracts a second torque $M_2$ about the axis of rotation 4.0 caused by the second weight force $F_2$. The first and the second torque $M_1$, $M_2$ are not necessarily constant and equal in the open and in the closed position and over the movement sequence in between, but they always act in the opposite direction of rotation and compensate each other to a large extent.

The optical opening 1 may be an area that is not physically confined and through which radiation strikes a detector. It may also be the opening of a diaphragm or the receiving surface of a detector. The optical opening 1 may have any shape, for example a round shape or preferably a rectangular shape, as shown in the following exemplary embodiments. Only the shape of the first shutter blade 3 or also of a second shutter blade 7, as shown in a second exemplary embodiment, must be adapted to this.

An embodiment of the camera shutter device with only a one-part shutter, which therefore only has the first shutter blade 3, is advantageous for the use of the camera shutter device for an offset adjustment in a (particularly thermal) IR camera (NUC, Non-Uniformity Correction), in which it is important that the shutter, which briefly closes the optical opening 1 for at least one image acquisition cycle, has a temperature on its surface that is as exactly uniform as possible. In the case of a two-part shutter, which thus has the first and the second shutter blades 3, 7, which inevitably have a different relative position to existing heat sources or heat sinks within the device, a resulting temperature difference between the first and the second shutter blades 3, 7 can already lead to the shutter not being well suited for offset adjustment.

Nevertheless, an embodiment having a first and a second shutter blade 3, 7 may even be advantageous for other applications.

Both for an embodiment of the camera shutter device with only the first shutter blade 3 as well as with the first shutter blade 3 and the second shutter blade 7 as part of the counterweight 5, it is advantageous if a first permanent magnet 6.1 or a first and a second permanent magnet 6.1, 6.2 are arranged in association with the counterweight 5 in order to hold the counterweight 5 in the open position and in the closed position by magnetic force when the electromagnetic drive 2 is in the de-energized state.

The first and second permanent magnets 6.1, 6.2 each have at least one magnetic face 14. For the purposes of this description, the magnetic face 14 is understood to be a surface that has at least one magnetic pole.

In the following five exemplary embodiments, four embodiments are described on the basis of drawings, each of which has only the first shutter blade 3, as well as one embodiment which also has a second shutter blade 7.

According to a first exemplary embodiment, shown in FIG. 1a in an open position and shown in FIG. 1b in a closed position, the camera shutter device has only the first shutter blade 3.

The counterweight 5 is made of a ferromagnetic material, and first and second permanent magnets 6.1, 6.2 are provided to hold the counterweight 5 in the open position and alternatively in the closed position when the electromagnetic drive 2 is de-energized. The first and second permanent magnets 6.1, 6.2 are advantageously two identical bar magnets with the same holding force and an axis of symmetry, which are aligned with each other on a straight line. The counterweight 5 has the shape of a round disk, the center of which is on the straight line in the open and closed positions. The magnetic faces 14 facing the counterweight 5, here containing e.g. the north or south pole of the first or second permanent magnet 6.1, 6.2, respectively, are typically planar surfaces or advantageously cylinder section surfaces with a slightly larger radius than that of the counterweight 5.

Advantageously, the first and second permanent magnets 6.1, 6.2 do not themselves act as stops and a gap 12 remains between the counterweight 5 and the first and second permanent magnets 6.1, 6.2 respectively in the open and closed positions. The gap 12 is advantageous to limit the holding force and in particular prevents wear of the magnetic face 14. The gap 12 is narrower than any distance between the counterweight 5 and the first and second permanent magnets 6.1, 6.2, respectively, during movement between the open position and the closed position. This statement advantageously also applies to the further exemplary embodiments described below.

The pivot angle range $\alpha$ is advantageously limited by the stroke length or by mechanical stops against which, for example, the moving part or the two-armed lever 4 abuts. The electromagnetic drive 2 is realized here by a solenoid 8, with a coil 8.1 and a ferromagnetic or permanent-magnet armature core 8.2.1 attached to a plunger 8.2, which here represents the moving part of the electromagnetic drive 2.

Figure 6:
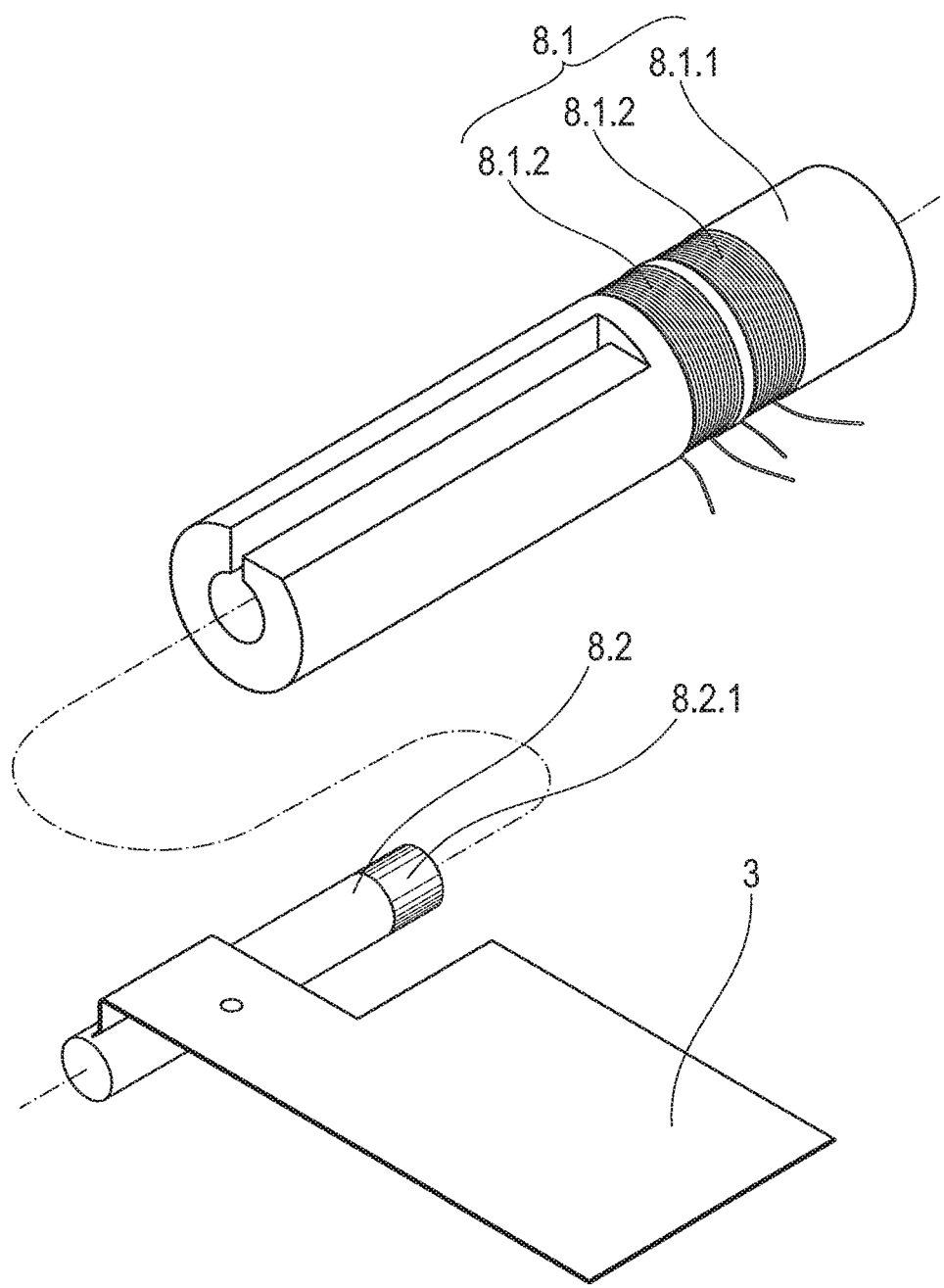
FIG. 6 is a detailed view showing a solenoid and a first shutter blade in an exploded view.

The coil 8.1 has a bobbin 8.1.1 which serves not only as a support for the winding 8.1.2, but advantageously also as a sliding guide 10 for the plunger 8.2, as shown in FIG. 6. For this purpose, the bobbin 8.1.1 is extended beyond a length intended to accommodate the winding 8.1.2 and slotted along the extension. The plunger 8.2, which is fixedly connected to the first shutter blade 3, can thus slide inside the bobbin 8.1.1. No additional component is required to guide the plunger 8.2.

The first shutter blade 3, which is fixedly connected to the plunger 8.2, is guided linearly between the open and closed positions, in a direction determined by the direction of movement of the armature core 8.2.1, while the two-armed lever 4 is pivoted about a fixed pivot point P over a pivot angle range $\alpha$. The movement of the armature core 8.2.1 takes place over a stroke length which is advantageously greater than half of an overall length of the camera shutter device. The overall length is the maximum extension of the camera shutter device in the direction of movement of the armature core 8.2.1. The connection with the two-armed lever 4 and the unit 23 is made via a pin/elongated hole connection. Thus, during the motion sequence, the distance of the point of application of the first weight force $F_1$ from the pivot point P changes and consequently the length of a first lever arm $r_1$, which also changes the first torque $M_1$. The length of a second lever arm $r_2$ remains constant. Moreover, both torques $M_1$, $M_2$ change due to the changes of the angles $\phi_1$, $\phi_2$. The first and the second torque $M_1$, $M_2$ do not have to change equally.

Due to the direct connection of the moving part, which in this first exemplary embodiment is the plunger 8.2, with the first shutter blade 3, the movement of the armature core 8.2.1 is transmitted at a transmission ratio of 1:1. In order to be able to dimension a short length on the bobbin 8.1.1, compared to the range of movement of the plunger 8.2, for accommodating the winding 8.1.2, the winding 8.1.2 is designed as an at least two-phase winding. It can consist of at least two bipolar single windings arranged one behind the other on the bobbin 8.1.1 or of unipolar pairs of windings whose two halves are wound in opposite directions. A temporally and thus phase-shifted control leads to a comparatively larger stroke length than would be achievable with a coil with only one single winding of the same winding length. A longer stroke length is also obtained when using a permanent-magnet armature core 8.2.1 and alternating the use of attractive and repulsive forces by reversing the direction of the magnetic field of the coil 8.1. In the case of bipolar single windings, the current flow is reversed for this purpose; in the case of unipolar pairs of windings, the current flow is alternately applied to one or the other half of the winding.

Advantageously, the coil 8.1 is partially or completely enclosed by a ferromagnetic enclosure 11, which increases a magnetic flux generated inside the coil 8.1 and reduces a stray field generated around the coil 8.1.

The second exemplary embodiment, shown in FIG. 2*a* in an open position and shown in FIG. 2*b* in a closed position, differs from the first exemplary embodiment or embodiments of the aforementioned modifications in that only a first permanent magnet 6.1 is present, by its arrangement relative to the counterweight 5 and the geometric shape of the counterweight 5. The shape of the counterweight 5 here represents a segment of a round disk which has on its outer circumferential surface two planar surface sections which enclose an angle of less than 180° with one another, one of the planar surface sections in each case being parallel opposite an identical magnetic face 14 of the first permanent magnet 6.1 in the open or closed position. For this purpose, the first permanent magnet 6.1 is arranged within the pivot angle range $\alpha$. Here, the magnetic face 14 is a planar surface.

Figure 3A:
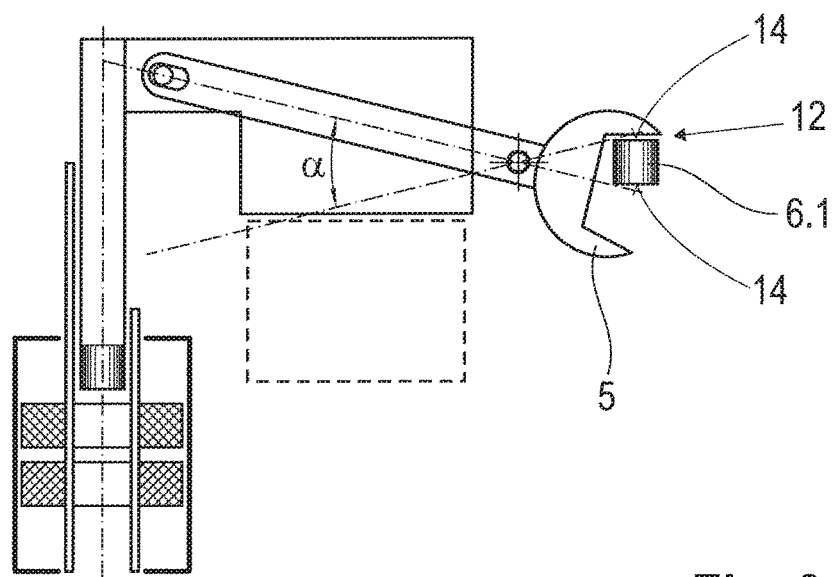
FIGS. 3a and 3b show a third exemplary embodiment, wherein the counterweight is pivotable about a first permanent magnet.
Figure 3B:
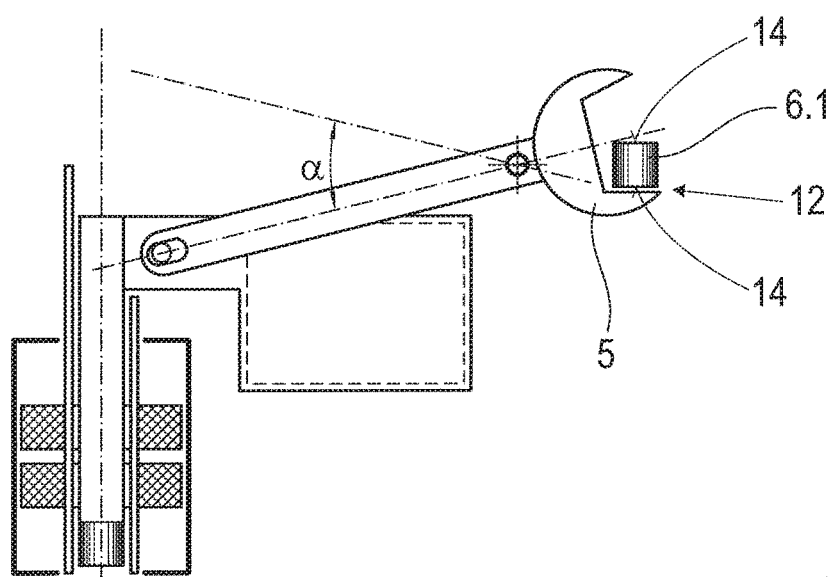

The third exemplary embodiment, shown in FIG. 3*a* in an open position and in FIG. 3*b* in a closed position, differs from the second exemplary embodiment in the shape of the counterweight 5. Here, the counterweight 5 has the shape of an open-end wrench, with an inner circumferential surface showing two flat surface areas. Said flat surface areas are each opposite one of the planar magnetic faces 14 in the open or closed position, with an equal gap 12 of equal thickness and equal width. The first permanent magnet 6.1 is arranged within the pivot angle range $\alpha$ and within the counterweight 5.

Figure 4A:
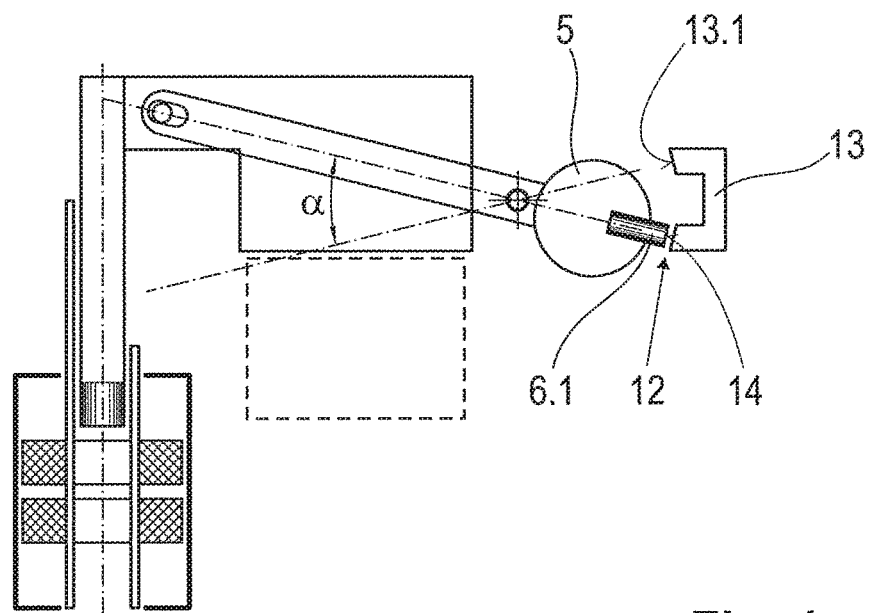
FIGS. 4a and 4b show a fourth exemplary embodiment, wherein a first permanent magnet is fixedly connected to the counterweight and is pivotable relative to a ferromagnetic armature.
Figure 4B:
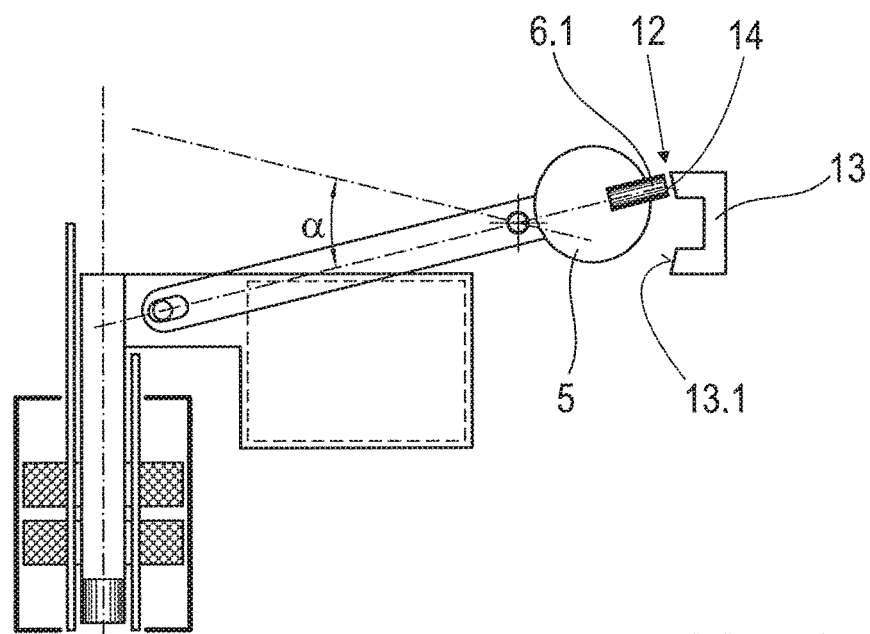

According to the fourth exemplary embodiment, shown in FIG. 4*a* in an open position and in FIG. 4*b* in a closed position, the first permanent magnet 6.1 is fixedly attached to the counterweight 5 within the pivot angle range $\alpha$ and radially aligned with the pivot point P, so the counterweight 5 itself need not be made of a ferromagnetic material in this case. A ferromagnetic armature 13, with two flat end faces 13.1 facing the pivot point P, is also statically fixed within the pivot angle range $\alpha$. In the open position and the closed position, one of the end faces 13.1 faces an identical one of the magnetic faces 14 in each case, forming an equal gap 12.

The magnetic faces 14, the end faces 13.1 or the surface sections on an inner or outer circumferential surface of the counterweight 5 have been described as planar surfaces in the exemplary embodiments; they may also take other surface shapes, such as cylindrical, conical or spherical surface sections. It is known to the skilled person that the concrete course of the magnetic force during the movement over the pivot angle range $\alpha$ can be specifically influenced by the design of the magnetic faces 14.

Figure 5A:
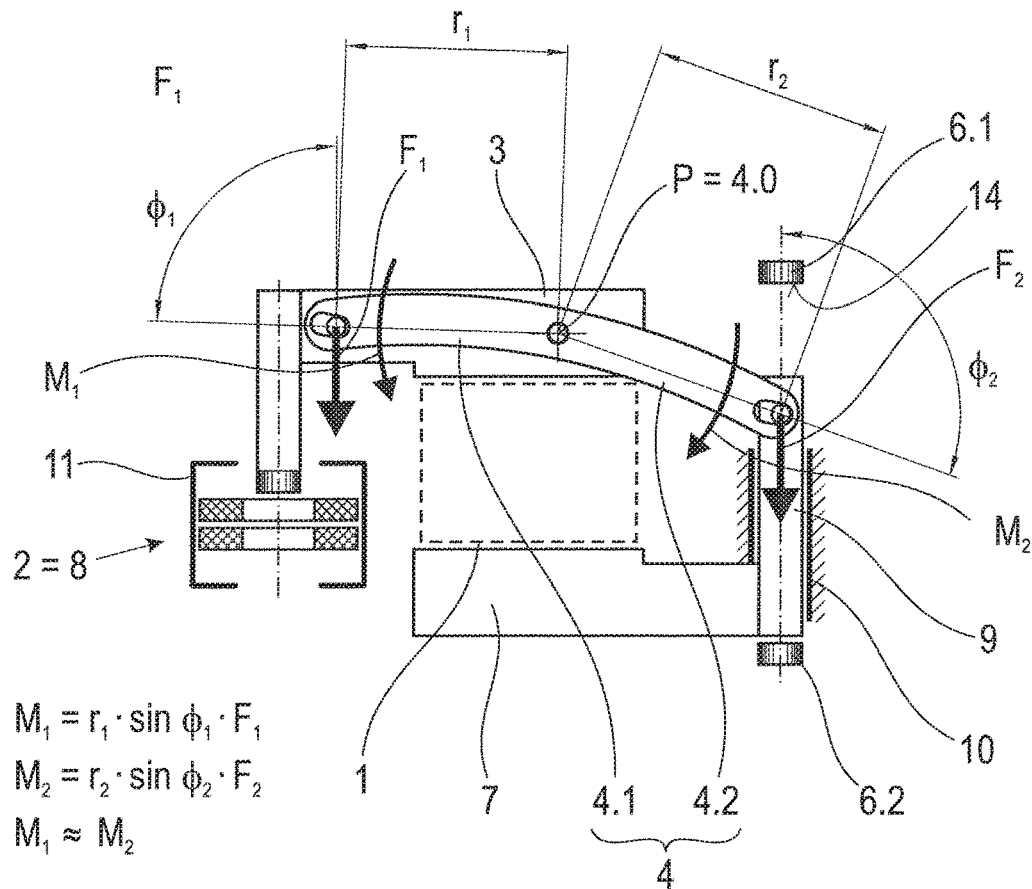
FIGS. 5a and 5b show a fifth exemplary embodiment with two shutter blades.
Figure 5B:
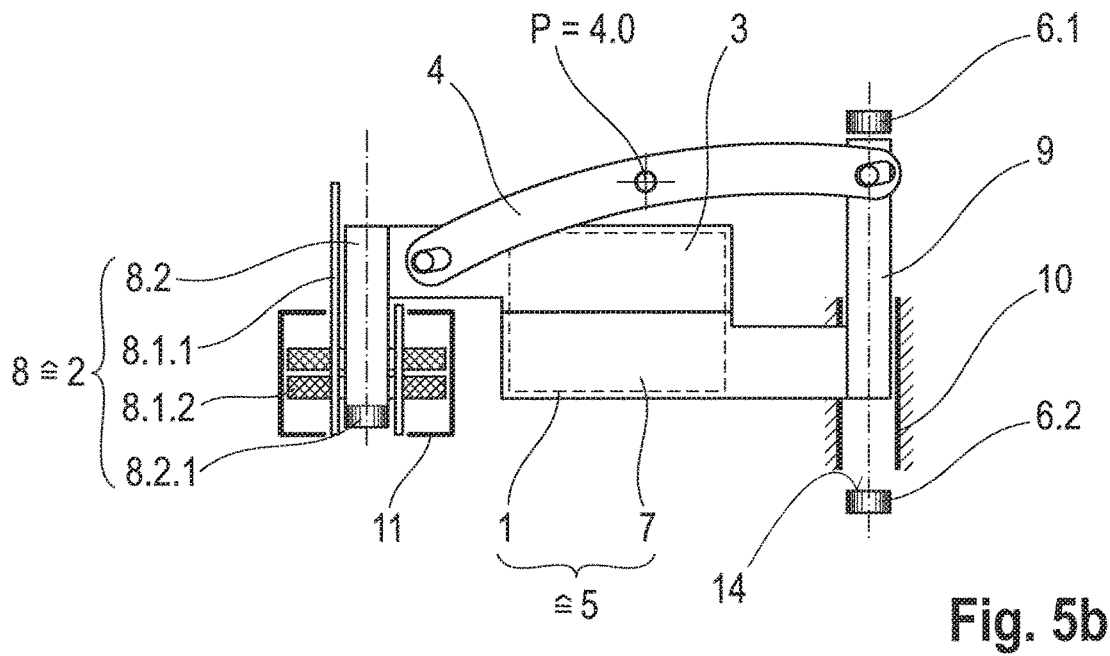

According to a fifth exemplary embodiment, shown in FIG. 5*a* and FIG. 5*b*, the counterweight 5 includes a second shutter blade 7. This exemplary embodiment differs from the first exemplary embodiment only in the design of the counterweight 5.

The counterweight 5, which in the first exemplary embodiment is fixedly connected to the output end 4.2 of the two-armed lever 4 and thus moves on a circular path, moves here, like the unit 23, in a straight line and orthogonally to the axis of rotation 4.0. For this purpose, comparable to the unit 23, which is connected to the input end 4.1 of the two-armed lever 4 via a pin/elongated hole connection, it is rotatably connected to the output end 4.2 of the two-armed lever 4 via a pin/elongated hole connection, whereby the length of the second lever arm $r_2$ also changes here during the movement sequence. Advantageously, the second shutter blade 7 is attached to a connecting rod 9, comparable to the connection of the first shutter blade 3 to the plunger 8.2. The connecting rod 9 is made of a ferromagnetic material and can thus be held by the first or the second permanent magnet 6.1, 6.2. As with the plunger 8.2, there is a pin on the connecting rod 9, which is guided in an elongated hole formed on the two-armed lever 4.

A sliding guide 10 is provided for linear guidance of the connecting rod 9. The first and second shutter blades 3, 7 are moved simultaneously in opposite directions by only one electromagnetic drive 2.

In particular, an advantageous embodiment of the camera shutter device with only a first shutter blade 3 is significantly more compact compared to the prior art. Advantageously, the first and second permanent magnets 6.1, 6.2 exerting a holding force in the direction of movement of the first shutter blade 3 in the position covering the optical opening 1 or in the position uncovering the optical opening 1 ensures that the first shutter blade 3 is held in a stable position even when shocks or vibrations act on the camera shutter device in the direction of movement.

LIST OF REFERENCE NUMERALS

1 optical opening
2 electromagnetic drive
3 first shutter blade
   23 unit
4 two-armed lever
   4.0 axis of rotation
   4.1 input end
   4.2 output end
5 counterweight
   6.1 first permanent magnet
   6.2 second permanent magnet
7 second shutter blade
8 solenoid
   8.1 coil
   8.1.1 bobbin
   8.1.2 winding
   8.2 plunger
   8.2.1 armature core
9 connecting rod
10 sliding guide
11 enclosure
12 gap
13 armature
   13.1 end face of the armature
14 magnetic face
P pivot point
α pivot angle range
$M_1$ first torque
$M_2$ second torque
$F_1$ first weight force
$F_2$ second weight force
$\phi_1$ first angle
$\phi_2$ second angle
$r_1$ first lever arm
$r_2$ second lever arm

The invention claimed is:

1. A camera shutter device, comprising:
an optical opening,
an electromagnetic drive fixedly arranged to the optical opening and having a linearly guided moving part,
a first shutter blade movable to an open position exposing the optical opening and to a closed position covering the optical opening, and
a two-armed lever divided by a pivot point into an input end and an output end with a counterweight, the two-armed lever configured to be pivoted about the pivot point over a pivot angle range,
wherein:
the pivot point is located on an axis of rotation fixed relative to the optical opening and the input end is in communication with the moving part,
the first shutter blade forms a unit which is fixedly connected to the moving part,
a second weight force acts on the counterweight, causing a second torque about the axis of rotation that counteracts a first torque caused by a first weight force acting on the unit, and
a first permanent magnet, having at least one magnetic face, is fixedly arranged within the pivot angle range associated with the counterweight in such a way that the counterweight is held in an open position and a closed position by a magnetic force of the first permanent magnet, or
a first and a second permanent magnet, each having at least one magnetic face, are provided, which are arranged in association with the counterweight in such a way that the counterweight is held in an open position by a magnetic force of the first permanent magnet and in a closed position by a magnetic force of the second permanent magnet.

2. The camera shutter device according to claim 1, wherein when only the first permanent magnet is present, said counterweight is made of a ferromagnetic material and one of said at least one magnetic faces is arranged to face one of two different surface portions of an outer circumferential surface of said counterweight in the open position and the closed position, respectively.

3. The camera shutter device according to claim 2, wherein the respective magnetic face and the respective surface portion of the outer circumferential surface of the counterweight or the respective end face in the open position and the closed position each enclose a gap with each other that is narrower than any distance between the counterweight and the first and second permanent magnets, respectively, during the movement between the open and the closed position.

4. The camera shutter device according to claim 1, wherein when only the first permanent magnet is present, said counterweight is made of a ferromagnetic material and at least two magnetic faces are present, one of said at least two magnetic faces being arranged to face a surface portion of an inner circumferential surface of said counterweight in the open position and another of said at least two magnetic faces being arranged to face another surface portion of said inner circumferential surface of said counterweight in the closed position.

5. The camera shutter device according to claim 4, wherein the respective magnetic face and the respective surface portion of the outer circumferential surface of the counterweight or the respective end face in the open position and the closed position each enclose a gap with each other that is narrower than any distance between the counterweight and the first and second permanent magnets, respectively, during the movement between the open and the closed position.

6. The camera shutter device according to claim 1, wherein when only the first permanent magnet is present, the first permanent magnet is attached to the counterweight and a ferromagnetic armature with two end faces facing the counterweight is arranged within the pivot angle range, and wherein one of the at least one magnetic faces is arranged facing one of the two end faces in the open position and facing the other of the two end faces in the closed position.

7. The camera shutter device according to claim 6, wherein the respective magnetic face and the respective surface portion of the outer circumferential surface of the counterweight or the respective end face in the open position and the closed position each enclose a gap with each other that is narrower than any distance between the counterweight and the first and second permanent magnets, respectively, during the movement between the open and the closed position.

8. The camera shutter device according to claim 1, wherein when the first and second permanent magnets are present, said counterweight is made of a ferromagnetic material and said first and second permanent magnets are arranged opposite each other outside the pivot angle range and one of the at least one magnetic faces of said first permanent magnet is disposed opposite a surface portion of an outer circumferential surface of the counterweight in the open position, and one of the at least one magnetic faces of the second permanent magnet is disposed opposite another surface portion of the outer circumferential surface of the counterweight in the closed position.

9. The camera shutter device according to claim 8, wherein the counterweight includes a second shutter blade, and the second shutter blade is fixedly connected to a linearly guided connecting rod which, together with the second shutter blade, forms the counterweight and is rotatably mounted on the output end of the two-armed lever.

10. The camera shutter device according to claim 8, wherein the respective magnetic face and the respective surface portion of the outer circumferential surface of the counterweight or the respective end face in the open position and the closed position each enclose a gap with each other that is narrower than any distance between the counterweight and the first and second permanent magnets, respectively, during the movement between the open and the closed position.

11. The camera shutter device according to claim 1, wherein the counterweight includes a second shutter blade.

12. The camera shutter device according to claim 1, wherein the electromagnetic drive is a solenoid, with a coil and a ferromagnetic or permanent magnetic armature core, which is attached to a plunger, the plunger being the moving part.

13. The camera shutter device according to claim 12, wherein a ferromagnetic enclosure is provided that surrounds the coil, thereby increasing a magnetic flux created inside the coil and reducing a stray field created around the coil.

14. The camera shutter device according to claim 1, wherein a ratio of a stroke length of the electromagnetic drive to an overall length of the camera shutter device in the direction of the stroke length is greater than 1:2.

15. The camera shutter device according to claim 14, wherein the coil has a bobbin and an at least a two-phase winding.

16. The camera shutter device according to claim 15, wherein the bobbin is a linear sliding guide for the plunger.

* * * * *